(No Model.) 4 Sheets—Sheet 1.

A. C. WATT.
RAILROAD CROSSING SIGNAL.

No. 596,233. Patented Dec. 28, 1897.

WITNESSES:
Albert M. Mackerley
John Merrill

INVENTOR:
Alexander C. Watt,
by Eugene L. Arnott,
Attorney.

(No Model.)   4 Sheets—Sheet 2.

A. C. WATT.
RAILROAD CROSSING SIGNAL.

No. 596,233. Patented Dec. 28, 1897.

WITNESSES:
Albert M. Mackerly
John Merritt

INVENTOR:
Alexander C. Watt,
By Eugene L. Arnott,
Attorney.

(No Model.) 4 Sheets—Sheet 3.

A. C. WATT.
RAILROAD CROSSING SIGNAL.

No. 596,233. Patented Dec. 28, 1897.

WITNESSES: Albert M Mackerley, John Merrill

INVENTOR: Alexander C. Watt,
by Eugene L. Arnott,
Attorney.

(No Model.)  4 Sheets—Sheet 4.
A. C. WATT.
RAILROAD CROSSING SIGNAL.
No. 596,233.  Patented Dec. 28, 1897.
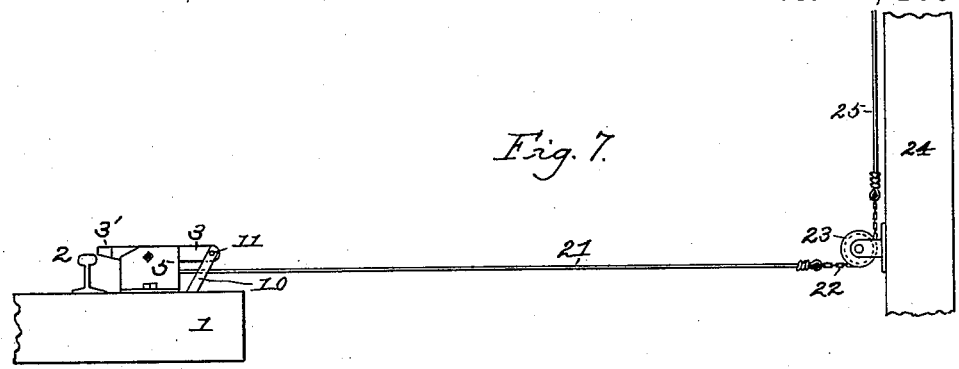
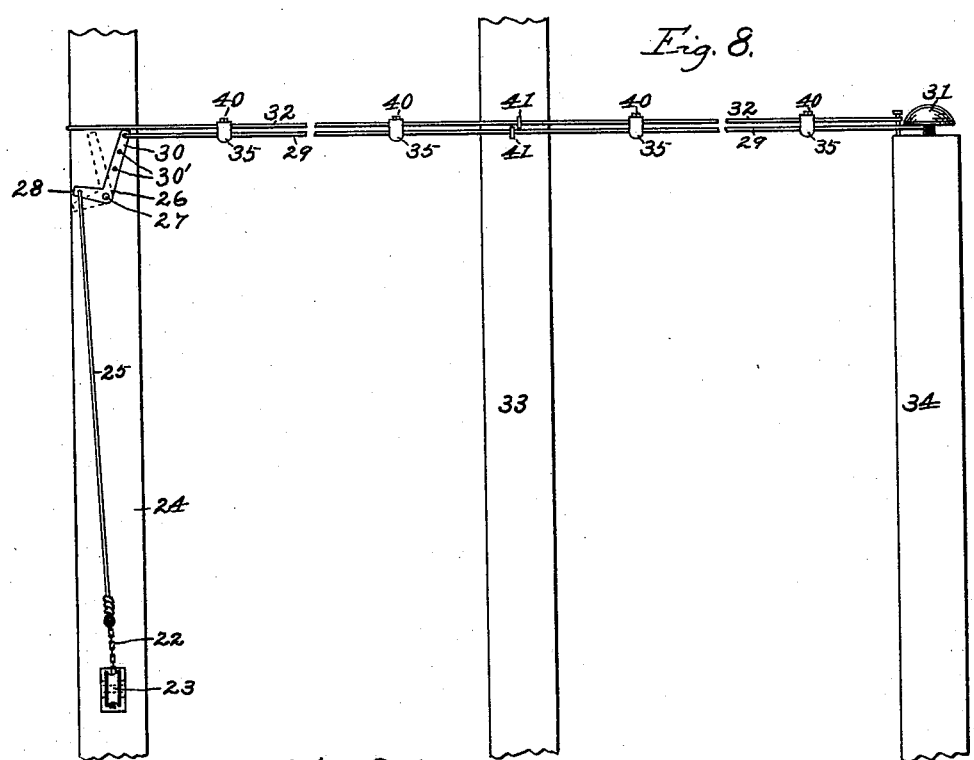
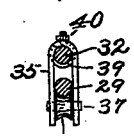
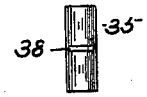
WITNESSES:
Albert M. MacKinley
John Merrill
INVENTOR:
Alexander C. Watt,
By Eugene L. Arnott,
Attorney.

UNITED STATES PATENT OFFICE.

ALEXANDER C. WATT, OF GREENFIELD, OHIO.

RAILROAD-CROSSING SIGNAL.

SPECIFICATION forming part of Letters Patent No. 596,233, dated December 28, 1897.

Application filed January 7, 1897. Serial No. 618,268. (No model.)

*To all whom it may concern:*

Be it known that I, ALEXANDER C. WATT, a citizen of the United States, and a resident of Greenfield, in the county of Highland and State of Ohio, have invented certain new and useful Improvements in Railroad-Crossing Signals, of which the following is a specification, reference being had to the accompanying drawings.

This invention relates to railroad-crossing signals; and the object of the invention is to provide means at road-crossings whereby people may be apprised of the approach of locomotives or cars, even when said locomotives or cars are hidden from view by embankments or buildings.

Figure 1:
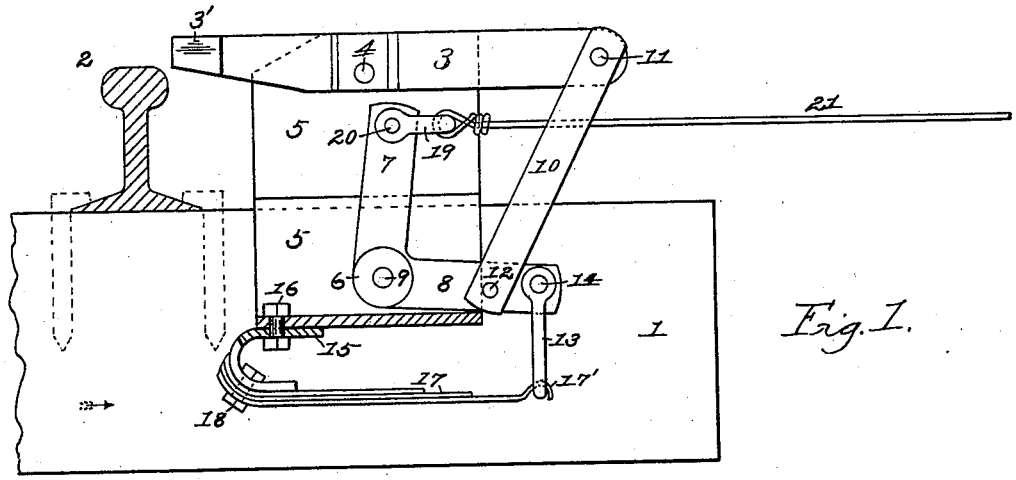
Figure 2:
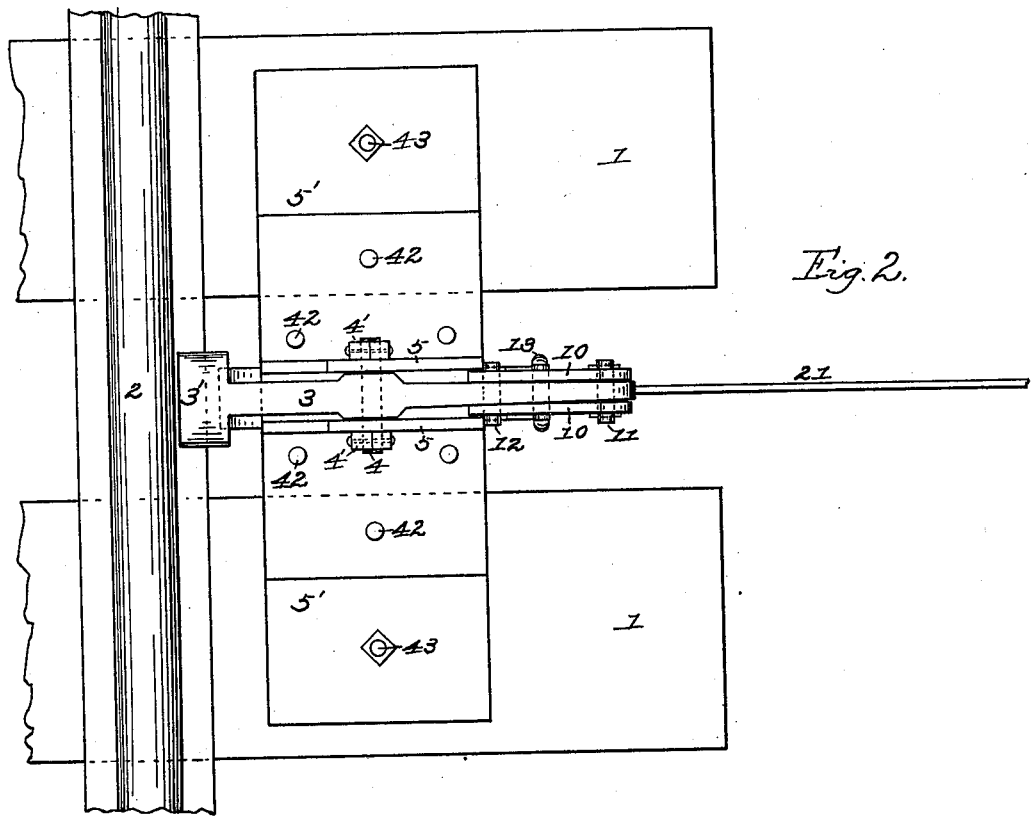
Figure 3:
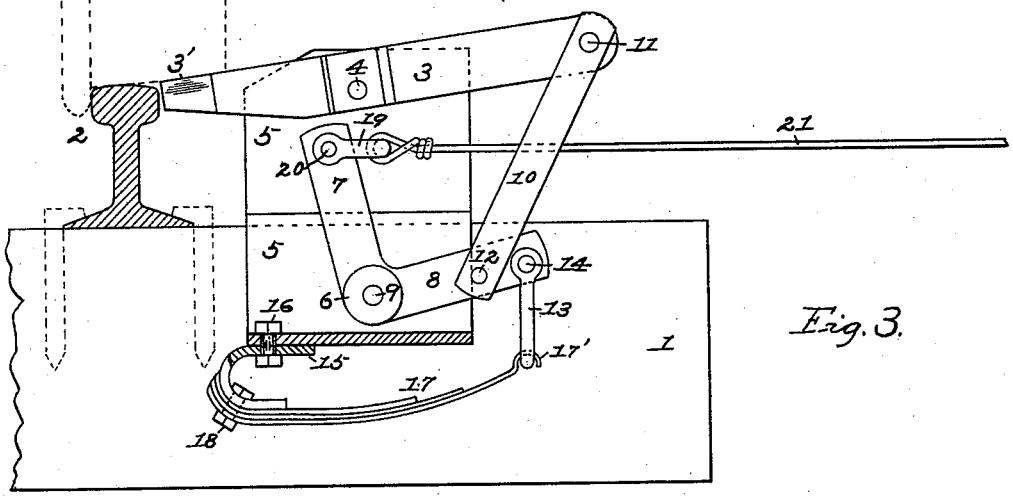
Figure 11:
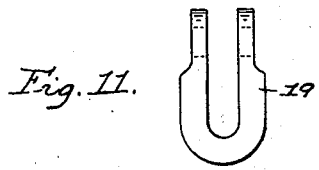
Figure 12:
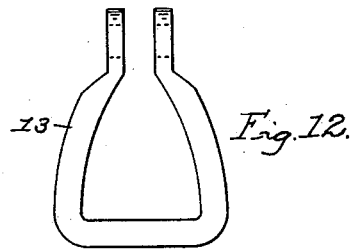
Figure 4:
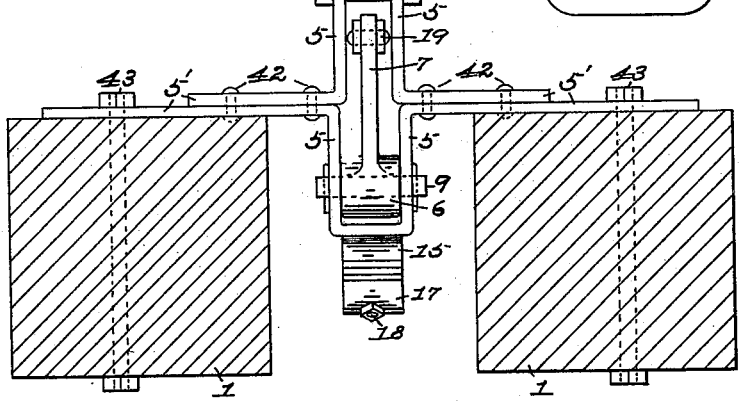
Figure 5:
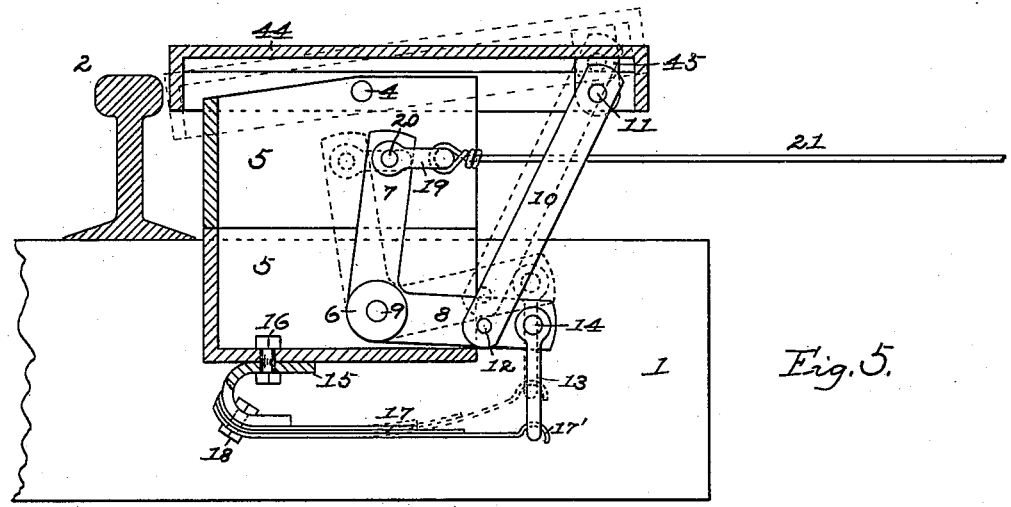
Figure 6:
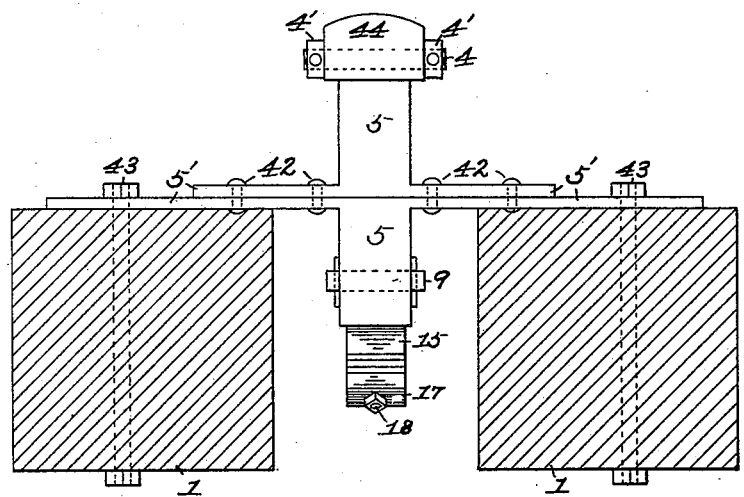

In the accompanying drawings, Figure 1 is a central vertical section of the device, which is placed on the ties close to the railroad-rail.
Fig. 2 is a top or plan view of the same. Fig. 3 is a central vertical section similar to Fig. 1, showing the parts in their operative position. Fig. 4 is an end view of the device, looking in the direction of the arrow in Fig.
1. Fig. 5 is a central vertical section showing a modified form of the device, and Fig. 6 is an end view of the same. Fig. 7 is a side elevation, drawn to a smaller scale, showing also the wire leading up the telegraph-pole.
Fig. 8 is a view showing the alarm bell or gong, the telegraph-poles, and the wires supported thereby. Fig. 9 is a detail view showing the wire-supporting device. Fig. 10 is a top or plan view of the same. Figs. 11 and 12 are detail views showing connecting links or clevises.

In the drawings, 1 represents the outer end of a wooden cross-tie, and 2 represents a railroad-rail upon the said tie. A bar 3, which may be called the "trip-lever," is pivoted at 4 to the frame 5. A bell-crank 6, with a vertical arm 7 and a horizontal arm 8, is pivoted at 9 to the frame 5. The parallel bars or links 10 have their upper ends pivoted at 11 to the outer end of bar 3 and their lower ends pivoted at 12 to arm 8. A clevis 13 is pivoted at 14 to the end of arm 8. A curved or U-shaped piece 15 is secured by bolt 16 to the under side of frame 5. A flat spring 17 is secured by bolt 18 to the under arm of piece 15. The end 17' of spring 17 is curved to fit over the lower part or cross-piece of clevis 13.

A clevis 19 is pivoted at 20 to the end of arm 7.

A wire 21 has its end secured to clevis 19. Wire 21 has its outer end secured to chain 22, and this chain works around a pulley 23. Pulley 23 is spiked or otherwise secured to telegraph-pole 24. A vertical wire 25 is secured to the upper end of chain 22. A bell-crank 26 is pivoted at 27 to the telegraph-pole 24. Wire 25 has its upper end secured in the lower or horizontal arm 28 of the bell-crank. A horizontally-disposed wire 29 is secured to the upper or vertical arm 30 of the bell-crank 26. This wire connects with the trip of a bell or gong 31, which may be of any approved pattern.

A wire 32 is stretched along poles 24 and 33 and is suitably secured to pole 34. Wire 32 is provided with supporting devices for wire 29. These supporting devices consist of inverted-U-shaped pieces 35, placed over wire 32 and provided with rollers 36 on pivots 37, and upon these rollers the wire 29 rests. This arrangement relieves the tensional strain from wire 29 and consequently from the spring in bell or gong 31. The pieces 35 are provided with slots 38 to admit the heads of screw-eyes 39. The heads of these screw-eyes pass around wire 32 and are secured in place by nuts 40 upon their threaded shanks. This holds the pieces 35 securely upon wire 32, but allows them to swing laterally. Suitable staples 41 support the wires upon pole 33. The bell or gong 31 is suitably supported upon pole 34.

The frame 5 consists, preferably, of angle-plates 5', secured together by rivets 42, as shown in Fig. 4. The frame 5 is placed between two ties and is secured to the ties by bolts 43 passing through these plates.

The frame 5 is placed upon the ties in such a position that the end 3' of lever 3 is close to and somewhat higher than rail 2. When the car-wheel passes along on rail 2, it will project over the rail far enough to strike the end of lever 3 and bring it down to a level with the rail. This will bring the parts of the device into operative position, as shown in Fig. 3. The outer end of lever 3 will be elevated, and this will elevate links 10, which in turn will elevate arm 8 and swing back arm 7 of bell-crank 6. Arm 8 will elevate clevis 13 and bend spring 17. Arm 7 will pull back the wire 21, which in turn will draw the chain 22 correspondingly around pulley 23. Wire 25 will be drawn down and bell-crank 26 will be swung around to the position shown in dotted lines. This will pull wire 29, which in turn will actuate bell or gong 31, thus sounding the alarm and indicating the approach of a train.

The car-wheel is represented in dotted lines in Fig. 3. When the wheel has passed the end of lever 3, the spring 17 will retract, thus returning the actuated parts to their normal positions, as shown in Fig. 1. The spring (not shown) in the bell or gong 31 will take up the corresponding slack in the wires. The next wheel will press down the end of lever 3 and sound the alarm again, and so of each wheel of the train.

The end 3' of lever 3 is made rounding on top, so that the wheel may strike and pass over it with the least resistance.

The vertical arm 30 of bell-crank 26 is provided with two or more holes 30', so that the travel of wire 29 may be adjusted to suit the bell or gong by inserting the end of the wire in the proper hole 30'.

The frame 5 is preferably placed on the ties directly opposite a telegraph-pole 24. Pole 34 is placed at the road-crossing. The wire 29 may be long enough, especially when supported on rollers 36, to give ample warning of the approach of a train. Special poles, however, may be used, if desired, or the wire 29 may in some cases be extended along the surface of the ground, incased in tubing or otherwise, as will be readily understood.

A modified form is shown in Figs. 5 and 6. Instead of lever 3 a lid or cover 44 is used. This cover is supported on pivot 4, the latter being held in position by nuts 4'. Cover 44 protects the parts from rain and weather and is rounding on top, so as to turn the water and also to offer less resistance to the car-wheel, which strikes the cover in this case instead of lever 3. A lug 45 is depended from the cover 44, and to this lug the links 10 are pivotally connected at 11. The end of frame 5 next to the rail 2 is preferably closed in this case. The parts are shown in their operative position in dotted lines in Fig. 5.

Having thus fully described my invention, what I claim as new, and desire to secure by Letters Patent, is—

1. In a railroad-crossing signal, the combination, with the alarm or gong, of a tripping-lever adjacent to the railroad-rail and adapted to be operated by the car-wheel, a frame or casing supporting said tripping-lever, a bell-crank supported in said frame or casing and having a horizontal and a vertical arm, a link connecting the outer end of the tripping-lever and the outer end of the horizontal arm of the bell-crank, a flat spring beneath said bell-crank and secured to said frame or casing, a link connecting the free end of said spring and the outer end of the horizontal arm of the bell-crank, and a connection between said bell-crank and said alarm or gong, whereby the car-wheel operates the alarm or gong, substantially as set forth.

2. In a railroad-crossing signal, the combination, with an alarm or gong, of a trip-lever adapted to be operated by the car-wheel, a wire stretched along the poles and connecting said bell or alarm and said trip-lever, said wire being held up by supporting devices arranged at intervals and suspended from another wire, said supporting devices consisting of inverted-U-shaped pieces provided with rollers upon which the lower wire rests, substantially as set forth.

3. In a railroad-crossing signal, the combination, with an alarm or gong, of a tripping-lever adapted to be operated by the car-wheel, a wire stretched along the poles and connecting said bell or alarm and said tripping-lever, said wire being held up by supporting devices arranged at intervals and suspended from another wire, said supporting devices consisting of inverted-U-shaped pieces provided with rollers upon which the lower wire rests, and having slots through which the screw-eyes extend and pass around the upper wire, the screw-eyes being held in position by nuts upon their threaded shanks, substantially as set forth.

ALEXANDER C. WATT.

Witnesses:
ALBERT M. MACKESLEY,
JOHN MCGILL.